(12) United States Patent
Labbe et al.

(10) Patent No.: US 7,158,938 B2
(45) Date of Patent: Jan. 2, 2007

(54) USER OPERATED GROUP MACHINE TIME SLOT RESERVATION AND MANAGEMENT SYSTEM

(75) Inventors: Jocelyn Labbe, Rochester, NY (US); Tallam I. Nguti, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 947 days.

(21) Appl. No.: 09/992,264

(22) Filed: Nov. 26, 2001

(65) Prior Publication Data

US 2003/0101249 A1   May 29, 2003

(51) Int. Cl.
*G06Q 10/00*   (2006.01)
(52) U.S. Cl. .......................................................... 705/5
(58) Field of Classification Search ...................... None
See application file for complete search history.

(56) References Cited

U.S. PATENT DOCUMENTS

| | | | | |
|---|---|---|---|---|
| 4,708,461 | A | * | 11/1987 | Okuda et al. .................. 399/87 |
| 4,799,281 | A | * | 1/1989 | Sandstrom ...................... 15/80 |
| 5,587,799 | A | * | 12/1996 | Kawamura et al. ......... 358/296 |
| 5,754,744 | A | | 5/1998 | Matsumoto et al. |
| 5,799,281 | A | * | 8/1998 | Login et al. .................... 705/1 |
| 5,901,067 | A | * | 5/1999 | Kao et al. ...................... 700/11 |
| 2001/0015817 | A1 | | 8/2001 | Adachi ....................... 358/1.13 |
| 2002/0082142 | A1 | * | 6/2002 | Cannon et al. ................. 482/1 |
| 2005/0075214 | A1 | * | 4/2005 | Brown et al. ................... 482/8 |

FOREIGN PATENT DOCUMENTS

JP   410094660   *   4/1998

OTHER PUBLICATIONS

Courter et al; Mastering Microsoft Office 2000 Professional Edition; 1999; SYBEX Inc.; pp. 494-510.*

R. Ramamoorthi, et al "A General Resource Reservation Framework for Scientific Computing" 'Online! Dec. 1997 Internet XP002274419 www.ifindkarama.com/attic/papers/iscope/.

S. Chapin, Q. Snell: "Metacomputing Resourse Reservations" 'Online! Jun. 2000, Scheduling Working Group, Internet XP002274420   www.unix.mcs.anl.gov/{schopf/ggf-sched/WD/schedwd5.txt.

* cited by examiner

*Primary Examiner*—Thomas A. Dixon
(74) *Attorney, Agent, or Firm*—Fay, Sharpe, Fagan, Minnich & McKee, LLP

(57) ABSTRACT

A group machine time slot reservation and management system and process including (a) a machine time slot reservation subsystem having a storage device for storing time slot reservation information, calendar and time clock information, time slot status information, intended user ID code information, and machine control information, for a user operated group machine; (b) receiving and analyzing wares for receiving and analyzing machine operation information including order quantity information for the UOGM; (c) capability for checking a status of any time slot corresponding with a current clock time; (d) a first programmed application for operating the UOGM to run the received order quantity when the current clock time shows no reserved time slots for the UOGM; (e) user ID verifier for receiving and processing an actual user ID code against the intended user ID code, when the current clock time corresponds to a reserved time slot; and (f) a second programmed application for enabling operation of the UOGM to run the received order quantity when the actual user ID code matches the intended user ID code, thereby enabling efficient and economical management of the time of the UOGM, and that of potential users thereof in a group work environment.

14 Claims, 6 Drawing Sheets

FIG. 2
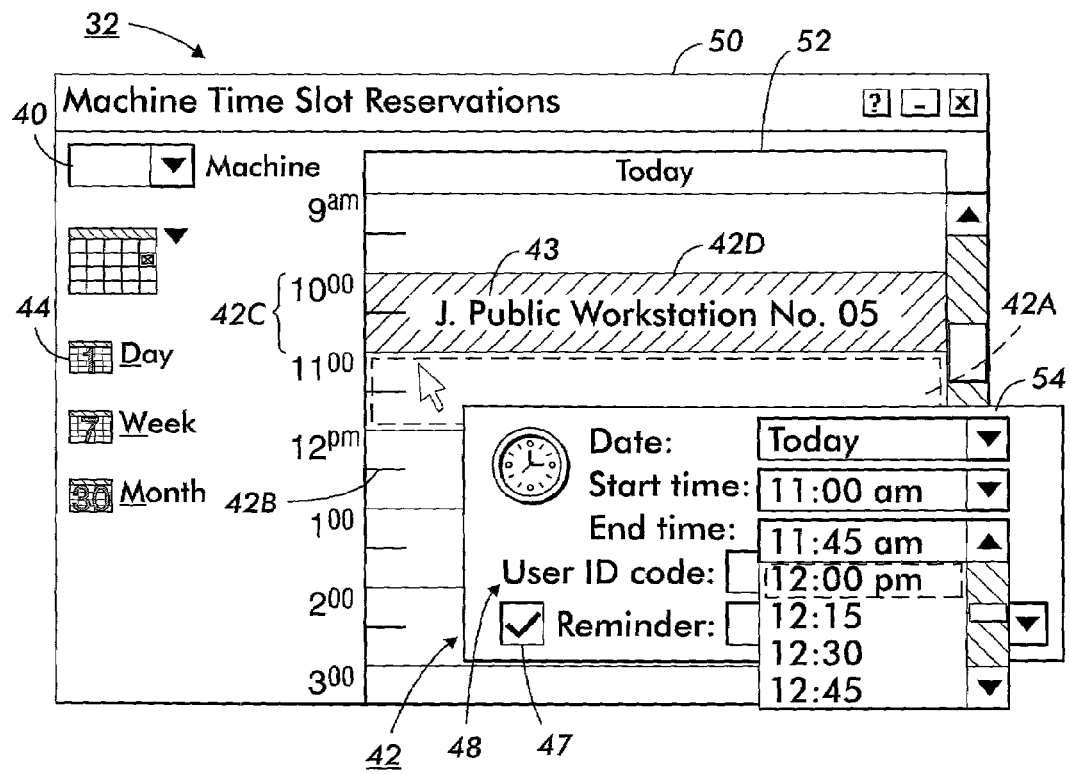
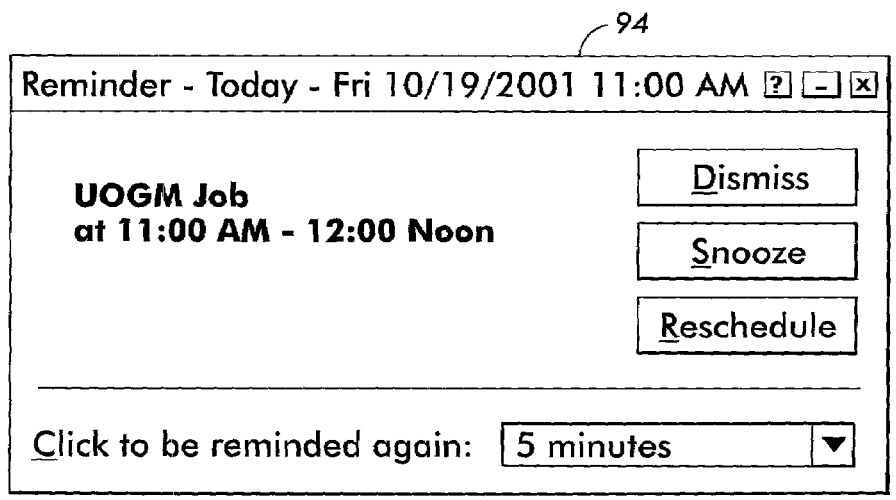
FIG. 3

USER OPERATED GROUP MACHINE TIME SLOT RESERVATION AND MANAGEMENT SYSTEM

BACKGROUND OF THE INVENTION

The present invention relates generally to user operated office group machines, and more particularly to a user operated group machine time slot reservation and management system for enabling efficient and economical management of the time of the machine, and of potential users of such the machine in a group work environment.

User operated office machines such as copiers, copier/printers, fax or facsimile machines, binders and the like, are of course well known. The most popular and frequently demanded such office machines are copiers and copier/printers, which generally are referred to as reprographic, or copy making machines. Typically in an office environment where a group of potential users of such a machine work, it is a common practice to locate such a user operated machine (that is a User Operated Group Machine) in a common area away from each potential user's actual work area.

Nowadays, it also common for each user among the group of potential users to be set in a reprographic system that includes the User Operated Group Machine (UOGM) and a personal computer (PC) work station.

A typical reprographic machine or copier is an office machine that includes a light lens, and in which a paper original image is in fact photographed. To do so, the original image is focused onto an area of a photoreceptor, which is subsequently developed with toner into a toner image on the photoreceptor. The toner image on the photoreceptor is subsequently transferred to a copy sheet and fused thereon to create a permanent hard copy of the original image.

A more recent type of reprographic machine, copier, copier printer is known as a digital copier or printing machine, and usually includes a smart controller or CPU. In its most basic functions, the digital copier or printing machine performs the same functions as a light lens copier, except that the original image to be copied is not directly focused on a photoreceptor. Instead, with a digital copier or printer, the original image is received electronically from a remote source such as a personal computer (PC) work station, or is scanned by an image scanning device generally known as a raster input scanner (RIS) including an array of photosensors. The original image is focused on the photosensors in the RIS. The photosensors convert the various light and dark areas of the original image to a set of digital signals. These digital signals may be temporarily retained in a memory and then eventually used to operate the digital printing machine or copier when it is desired to print copies of the original.

Another recent type of a user operated group machine is a digital multi-function machine which merely a single machine that provides the user with more than one function. An example of a typical multi-function machine would include a digital copy function; a digital printing function, and a digital facsimile function.

Because of the noise such User Operated Group machines make, they are typically located in an enclosed area with office cubicle height partitions around them, or in a separate room away from each of the potential users in the office group.

Users cannot always stand in front of the machine (UOGM) and wait for a long job being run to finish. None the potential users in a work group area likes to walk all the way to a machine for the purpose of operating it to run a job, only to find out when he/she gets there that somebody else was already at the machine an operating it to run perhaps a very long job. These two scenarios constitute significant inefficient abuses of user/operator time. In addition, there is and can also be inefficient use of machine and operator time whenever the machine while running a long job in the absence of an operator runs out of paper or suffers a jam. Often this is discovered only when the operator or user returns to the machine to pick up the copies of the long job only to realize then that the job had stopped some time ago due to a paper jam, an out of paper condition or a document misfeed.

There is therefore a need for a group machine Time Slot Reservation and management system that effectively enables efficient and economical management of the time of a User Operated Group machine, and that of potential users of such a machine in a group work environment.

SUMMARY OF THE INVENTION

In accordance with the present invention, there is provided a group machine time slot reservation and management system and process including (a) a machine time slot reservation subsystem having a storage device for storing time slot reservation information, calendar and time clock information, time slot status information, intended user ID code information, and machine control information, for a user operated group machine; (b) receiving and analyzing wares for receiving and analyzing machine operation information including order quantity information for the UOGM; (c) capability for checking a status of any time slot corresponding with a current clock time; (d) a first programmed application for operating the UOGM to run the received order quantity when the current clock time shows no reserved time slots for the UOGM; (e) user ID verifier for receiving and processing an actual user ID code against the intended user ID code, when the current clock time corresponds to a reserved time slot; and (f) a second programmed application for enabling operation of the UOGM to run the received order quantity when the actual user ID code matches the intended user ID code, thereby enabling efficient and economical management of the time of the UOGM, and that of potential users thereof in a group work environment.

BRIEF DESCRIPTION OF THE DRAWINGS

In the detailed description of the invention presented below, reference is made to the drawings, in which:

FIG. 2 is a graphical illustration of an exemplary time slot reservation display window in accordance with the present invention;

FIG. 3 is a graphical illustration of one embodiment of an intended user alerting device of the present invention in the form of a pop up reminder window;

DETAILED DESCRIPTION OF THE INVENTION

While this invention has been described in conjunction with a particular embodiment thereof, it shall be evident that many alternatives, modifications and variations will be apparent to those skilled in the art. Accordingly, the present invention is intended to embrace all such alternatives, modifications and variations as fall within the spirit and broad scope of the appended claims.

Figure 1:
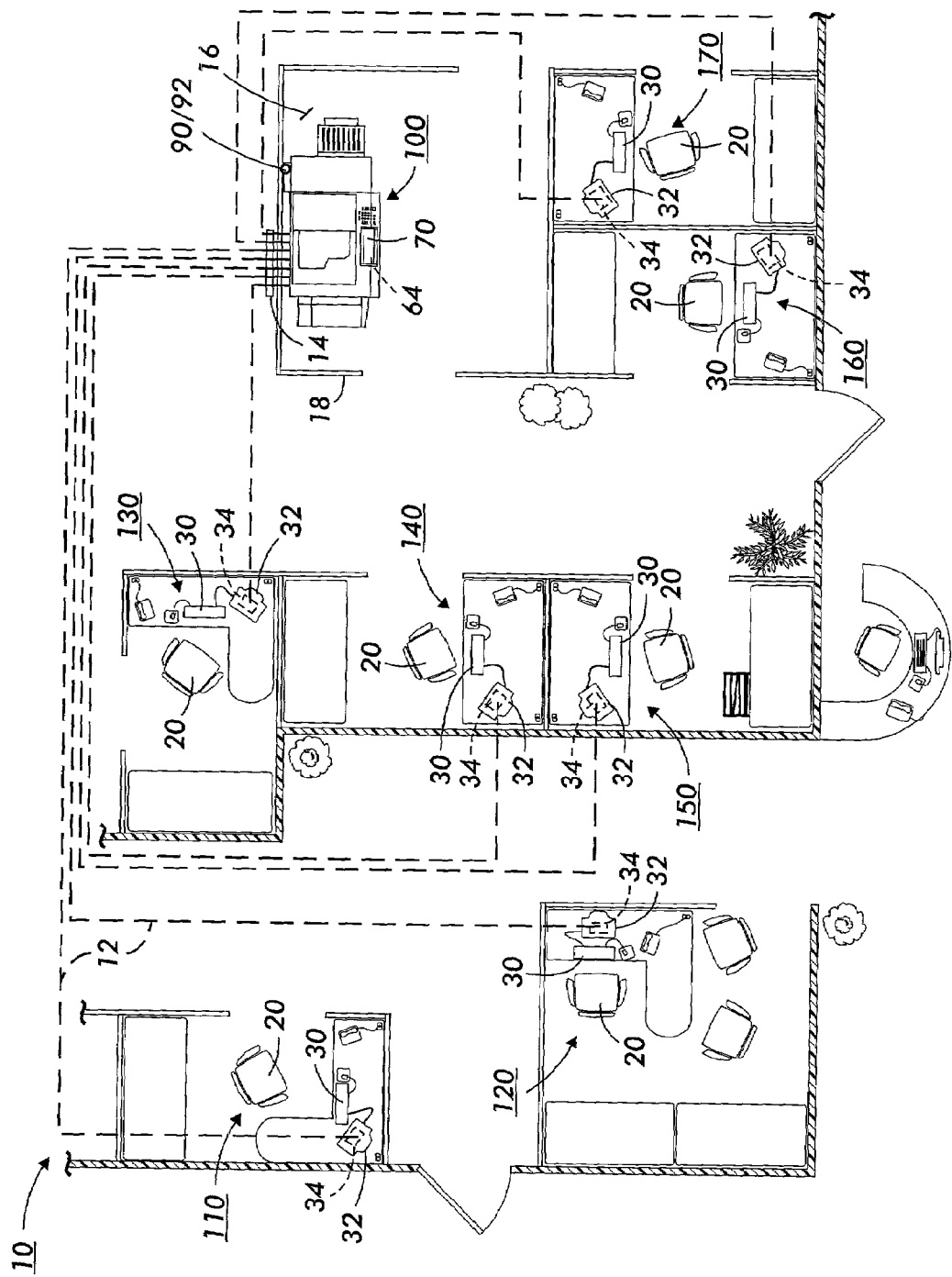
FIG. 1 is a graphical illustration of an exemplary group work environment including a user operated group machine in accordance with the present invention.

Referring now to FIG. 1, a group work environment or area is illustrated generally as 10, and includes at least one User Operated Group Machine (UOGM) 100. As pointed out above, the UOGM 100 can be for example, document copy reproducing machines such as copiers and copier/printers; fax or facsimile machines; binders; and the like. The group work environment 10 as also shown includes a plural number of workstations, for example the workstations shown as 110, 120, 130, 140, 150, 160, and 170. Each workstation 110, 120, 130, 140, 150, 160, 170 includes input means such as a keyboard 30, a display means such as a monitor 32, and each is connected to a control and computing subassembly 34 at the workstation or remotely over a local area network (LAN). It is common however for each workstation 110, 120, 130, 140, 150, 160, 170 to include a personal computer as the CPU of the control and computing subassembly 34 of the workstation.

As further shown, each workstation 110, 120, 130, 140, 150, 160, 170 is occupied by a potential user 20 (represented for example by a chair symbol) of the UOGM 100. Each workstation 110, 120, 130, 140, 150, 160, 170 is also connected from its control and computing subassembly 34, via communication links 12, to the UOGM 100. Such connection can also be carried out through a LAN server 14.

As mentioned above, typically in an office environment such as the group work area 10 including a group of potential users 20, the UOGM 100 will be located in a common area 16 away from each potential user's actual workstation. The common area 16 may be room with floor-to-ceiling solid walls, or it may be a partitioned cubicle with less than floor-to-ceiling partitions or dividers 18. In any case, the arrangement is often such that the UOGM 100 is not directly visible from all the workstations.

In such group work area 10 where the UOGM 100 is not in direct sight or view of each potential user, such users 20 cannot always be expected to stand in front of the it and wait for a long job being run to finish. It is not an economical or efficient use of their time. In addition, none the potential users 20 in a work group area 10 likes to walk all the way to the UOGM 100 for the purpose of operating it to run a job, only to find out when he/she gets there that somebody else was already at the machine and operating it to run perhaps a very long job. These two scenarios constitute significant inefficient abuses of user/operator time.

In addition, there is and can also be inefficient use of machine and operator time whenever the machine while running a long job in the absence of an operator runs out of paper or suffers a jam. Often this is discovered only when the operator or user returns to the machine to pick up the copies of the long job only to realize then that the job had stopped some time ago due to a paper jam, an out of paper condition or a document misfeed.

Referring now to FIGS. 2–3, the workstation computer or control subassembly 34 includes storage and computing means (the PC) for storing UOGM selection information 40 in group work areas with more than one UOGM, time slot reservation information 42, calendar and time clock information 44, time slot status information 46, intended user ID code information 48, and other machine control information, for the user operated group machine 100. The workstation monitor 32 includes means such as an icon for activating or opening an interactive machine time slot reservations screen 50 with interactive information receiving and displaying windows 52, 54.

Figure 4:
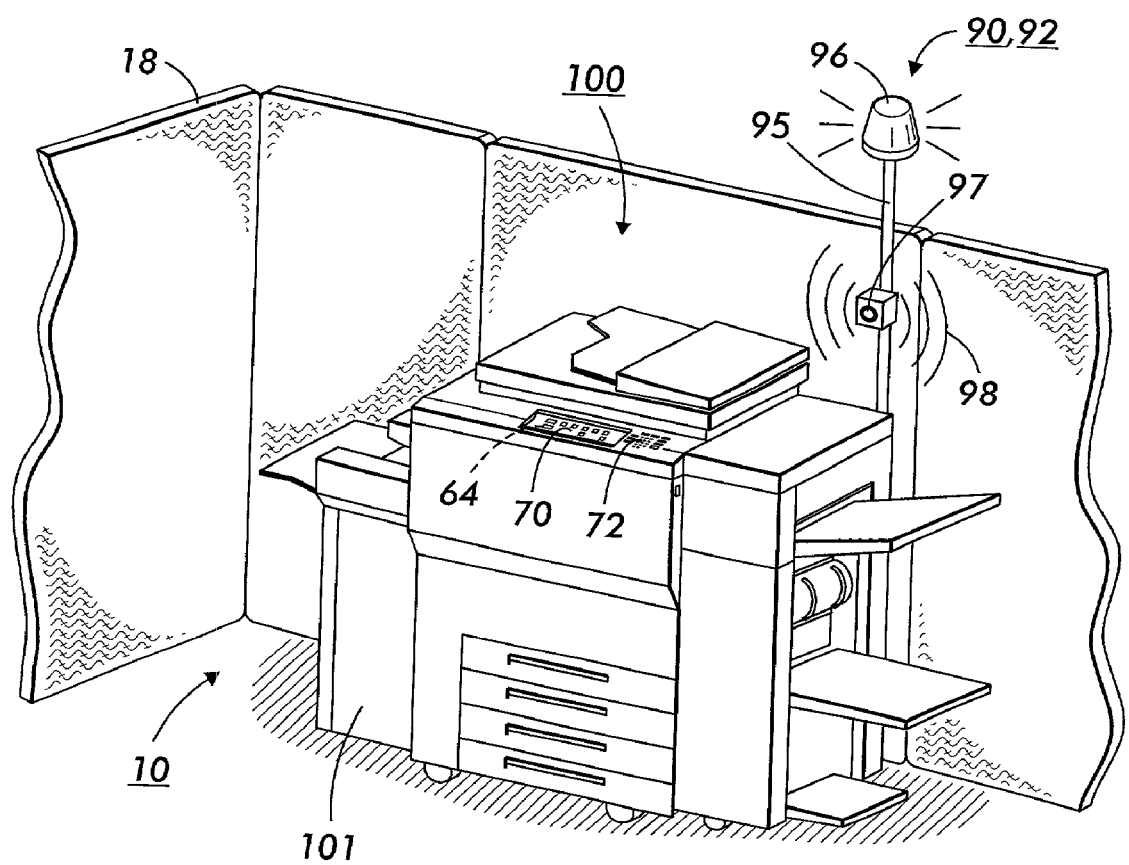
FIG. 4 is a graphical illustration of an exemplary user operated group machine (UOGM) of the present invention shown as a copy document reproducing machine including a second embodiment of an intended user alerting device of the present invention in the form of a light tower.

Referring now to FIG. 4, the UOGM 100 can be, for example, a reprographic or copy making machine 101 that includes a machine control subassembly or controller 64 having a user interface or control panel 70 as shown. In accordance with an aspect of the present invention, the machine or UOGM 100, 101 includes user ID information receiving and processing means 72 associated with the control panel 70. As is well known, an actual user of the machine 101 can enter via the control panel 70, a number of copies (or order quantity) that such user desires to make or run at the machine, using a single original or a plurality of originals.

Figure 5:
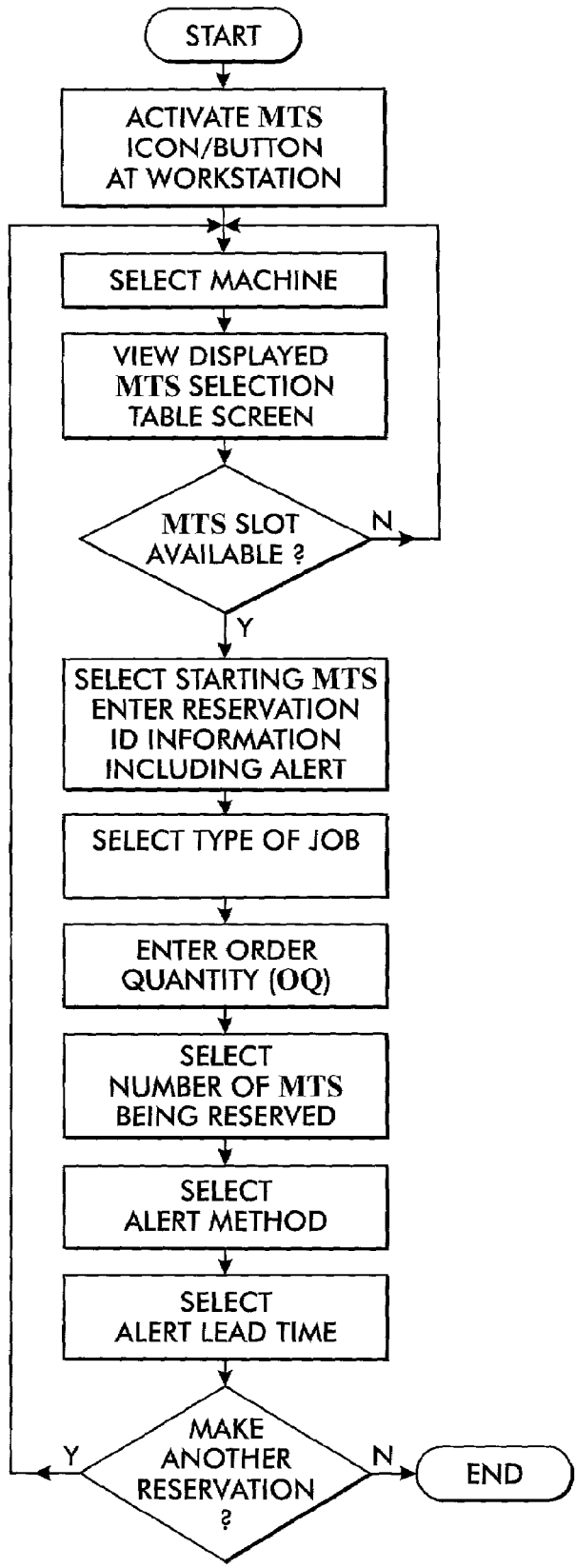
FIG. 5 is an illustration of the time slot reservation process of the present invention.

Referring now to FIGS. 1–2 and 5, the machine Time Slot Reservation (TSR) process of the present invention includes (a) displaying on a user interface device 50, 70 connected to a controller 34, 64, a Time Slot (TS) and Time Slot Status (TSS) information screen 50, 70 for a Machine (UOGM) 100; (b) reviewing the Time Slot Status (TSS) information 46; (c) providing Time Slot Reservation (TSR) information 42 onto the screen when the TSS information shows at least one Open Time Slot (OTS) 42A for the UOGM; and confirming and saving at least one TS, for the UOGM, responsively to the provided TSR information, thereby enabling subsequent efficient and economical management of the time of the UOGM, and the time of potential users thereof in a group work environment.

The displaying step includes displaying selectable month 44A, week 44B, day 44C and time 44D calendar information on the screen. The process may comprise displaying only current and future date and time selectable calendar information, or it may also include displaying for historical or record information purposes all past and future time slot reservation activities for a particular UOGM.

As shown, the system and process includes displaying time slot symbols for example the bar 42B as shown, and time divisions 42C for designated Time Slots for a particularly UOGM during a work group's work day shift. The time divisions 42C for designated Time Slots may be floating or variable, or they may be fixed time divisions.

The time slot symbol or bar 42B itself may be interactive and selectable for displaying the information receiving sub-window 52 when a time slot corresponding to a time division for such symbol is an open time slot 42A. As further shown, the displaying step includes highlighting already reserved time slots 42D for each calendar month, date and time of day for each desired UOGM, and for example by including contact information such as the intended user's name 43 or workstation number.

Thus according to the present invention, the group machine Time Slot Reservation (TSR) apparatus or system includes a controller assembly 34, 64 having means for processing and storing information, and at least one user interface 50, 70 having display means for displaying UOGM selection information 40 in group work areas with more than one UOGM, time slot reservation information 42, calendar and time clock information 44, time slot status information 46, intended user ID code information 48, and machine other control information.

The (TSR) apparatus or system also includes input means such as the keyboard 30, or control panel 70, for providing Time Slot Reservation (TSR) information to the controller assembly 64 for the UOGM 100, 101, when the TSS information includes at least one Open Time Slot 42A (for the UOGM). The controller assembly includes a program or application 80 for confirming and saving at least one TS, as a Reserved Time Slot (RTS) 42D, responsively to the TSR information. In this manner, efficient and economical management of the time of the UOGM, and that of potential users thereof in a group work environment, are enabled.

As pointed out above, the TSR system or apparatus includes alerting means 90 such as the light tower 92 (FIG. 4) and/or the pop up reminder window 94 (FIG. 3) which are in communication with the controller assembly 34, 64 for alerting an intended user 20 of a Reserved Time Slot (RTS) 42D that the time slot has been reached or is about to be reached. As such, the alerting means 90 can be adapted to alert the intended user 20 at a stored lead-time, for example 1, 2 or 5 minutes, prior to a clock time corresponding to the reserved time slot.

As shown in FIG. 3, the alerting means 90 can comprise the pop up reminder window 94 for timely popping up on a workstation screen 50 of the intended user in a manner as described above. The pop up window 94 can also be accompanied by a sound and/or animation or flashing in order to be more effective in alerting the intended user. Alternatively, or in combination, the alerting means 90 as shown in FIG. 4, can also comprise the light tower 92 including a pole 95 and a light source 96 having an ON state and an OFF state. The light source may also include a flashing ON and OFF state. The pole 95 should be long enough relative to the partitions 18 so that the light source 96 is visible remotely from various workstations 110, 120, 130, 140, 150, 160, 170 within the group work environment 10.

In operation, the light source 96 can be set so that it is in the ON state when the UOGM 100, 101 is running, and in the OFF state when the UOGM is not running. The light source 96 may also be set to flash ON and OFF when a job is interrupted or stopped before completion due to any reason (for example, paper jams, out of paper, user presses stop, or whenever the machine needs servicing). The ON and OFF flashing state should return to the ON state when the machine 100, 101 is serviced and resumes the interrupted job, and the ON state of the light should return to the OFF state when the machine has completed a job and is ready for the next job.

The long pole 95 may also include a small hidden speaker 97 that emits a certain sound pattern 98 at particular pre-programmed times. The sound pattern 98 and light 96 for example can be programmed to work as follows. Where the users 20 in a group have been assigned numbers, when the machine is idle and the clock time corresponds to a time slot previously reserved by, or for, user number one, the speaker will emit a single call beep followed by and ending beep. For the number three user, it will be three call beeps followed by and ending beep, and so on. In the case of an interrupted job, the light flashes ON and OFF and the speaker emits a sound pattern for example of a series of ending beeps. The speaker for example can emit four such beeps per second for five seconds, pause and then repeat, whenever a job is interrupted or stopped before completion due to any reason (paper jams, out of paper, etc. whenever the machine needs servicing).

Referring again to FIGS. 1–4, the controller assembly 34, 64 in one embodiment may comprise the controller subassembly 64 of the UOGM, in which case each time slot reservation will be carried out using the control panel 70 of the UOGM and at the UOGM. The controller assembly 34, 64 in another embodiment may include just the control subassembly 34 of a personal computer (PC) workstation 110, 120, 130, 140, 150, 160, 170. The controller assembly 34, 64 in yet another embodiment may include both the controller subassembly 34 associated with the personal computer (PC) workstation, and having a first display means 50, as well as the UOGM controller subassembly 64 having a second display means 70 located at the UOGM.

Thus as shown in FIG. 5, the reservation process includes activating a machine time slot (MTS) icon or button to open a display screen for example, 50 (FIG. 2). From the open screen, a particular machine in an environment with more than one machine, can be selected 40. One can then view the displayed information on the screen for an open time slot 42A to be selected. Selecting the open time slot will allow time slot reservation information 42 to be entered, along with starting and ending times, reminder information 47, and intended user ID code information 48.

The reservation system may include programmable means 34, 64 for recommending that some very large and difficult jobs be scheduled for low machine demand hours, for example for late afternoon or evening hours. In such cases, the system may require that the person attempting to reserve time slots provide job information, for example the type of job, and the job order quantity. The system may automatically determine how many time slots to reserve for each job, or the reserver may also select how many time slots they desire to reserve. As shown further in FIG. 5, the reserver then may chose a method of alerting them, which may be a pop up window 94 and/or the light tower 92. One can make another separate reservation after finishing a time slot (s0 reservation.

In addition to the time slot reservation system and process described above, the present invention also provides a Reservable Time Slot Management (RTSM) system and process that utilize most of the same means as the reservation system and process. The RTSM process includes the controller 34 and UOGM control subassembly 64, for example, receiving and analyzing order information, including an order quantity, for operating the UOGM. The UOGM control subassembly 64 includes a program for checking a status of any Time Slots for the UOGM that correspond with a current clock time, as well as programs for (a) requesting an actual User ID code from the operator actually attempting to use the UOGM when the current clock time corresponds to at least a Reserved Time Slot, (b) comparing the Actual User ID code with a stored Intended User ID code; and (c) operating the UOGM for the received order quantity when the Actual User ID code matches the stored Intended User ID code.

Other aspects of the programs can (i) compare the received order quantity information with a stored control quantity, (ii) operate the machine for the received order quantity when the current clock time shows no reserved Time Slots for the particular UOGM, and (iii) operate the machine for only the stored control quantity when the received order quantity is greater than the stored control quantity and the Actual User ID code does not match the Intended User ID Code.

Figure 6:
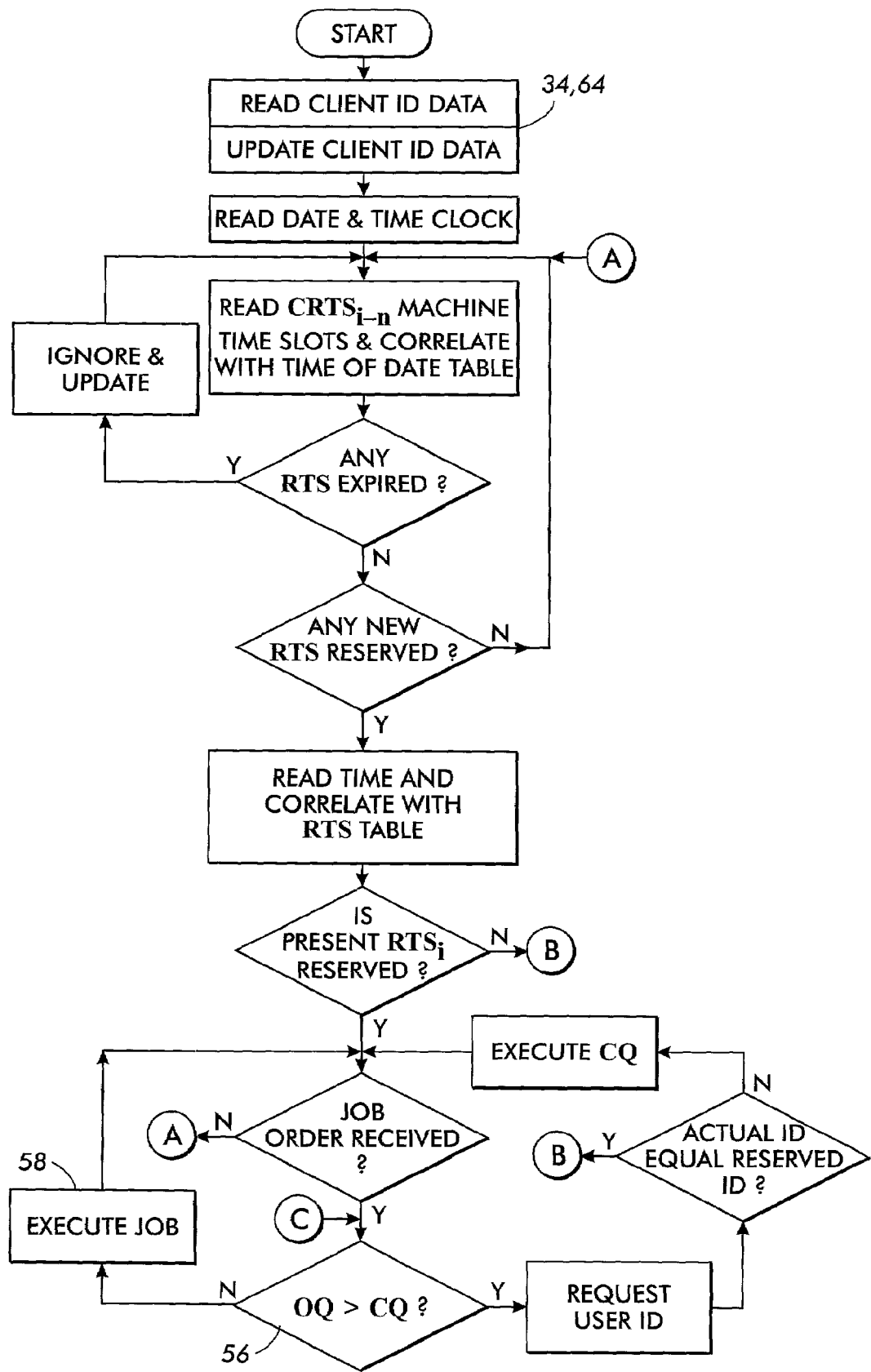
FIGS. 6 and 7 illustrations of the reservable time slot management process of the present invention.
Figure 7:
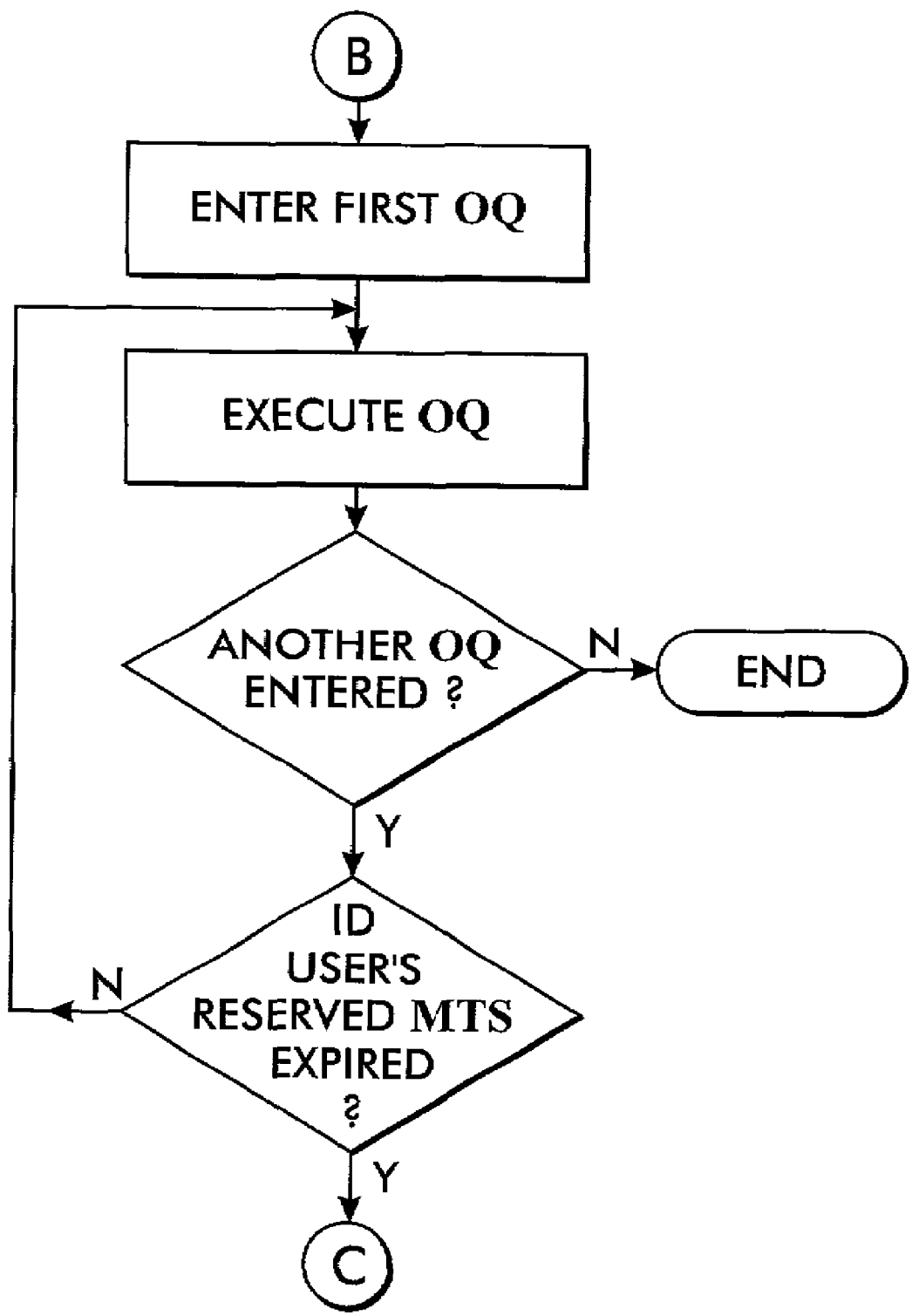

The RTSM system and process are illustrated in detail in FIGS. 5 and 6. As shown, the controller assembly reads and updates user ID data in storage, as well as calendar information such as month, week, day and time. It then reads the table of reserved time slots (RTS) from i–n, correlates them with clock time, and then checks for previously reserved time slots that have expired. Those that have expired are ignored for control purposes, but may be retained for record or history purposes. It then checks and notes which remaining time slots have been reserved, and which are open, then reads the clock time and correlates with such remaining time slots. The system knows at anytime before a job order is received whether the current clock time corresponds or does not correspond with a reserved time slot.

As illustrated, if the present or current time slot is reserved, the system reads the order quantity, for example the number of copies of the job. If the order quantity is less than a stored control number 56, for example 10 copies, the system will execute 58 the job without asking for such an actual user to identify themselves. However, if the order quantity is greater than the stored control quantity, then the system will not execute the job, and instead will first request user ID code information from the user. If the actual user ID does not match the previously stored intended user ID code (from the reservation screen), the system will execute only part of the job at the stored control quantity. The user may be prompted regarding whether will or will not accept such a partial quantity execution.

Where a job order is received and the current clock time does not correspond with a reserved time slot, the entire job will be executed for that job's order quantity. The same is true in the case where the current clock time corresponds to a reserved time slot and the actual user ID code matches the stored intended user ID code. As such, users in a group can plan when to run jobs, reserve the particular time slots at the UOGM, and thereby make efficient and economical use f their time. The system also allows continued and interruptible use of the machine time, even during previously reserved time slots, when in fact the intended user for one reason or another has failed to show up or actually shows up late for such a reserved time slot.

As can be seen, there has been provided a group machine time slot reservation and management system and process including (a) a machine time slot reservation subsystem including storage means for storing time slot reservation information, calendar and time clock information, time slot status information, intended user ID code information, and machine control information for a user operated group machine; (b) receiving and analyzing means for receiving and analyzing machine operation information including order quantity information for the UOGM; (c) means for checking a status of any time slot corresponding with a current clock time; (d) programmed means for operating the UOGM to run the received order quantity when the current clock time shows no reserved time slots for the UOGM; (e) user ID verification means for receiving and processing an actual user ID code against the intended user ID code, when the current clock time corresponds to a reserved time slot; and (f) programmed means for enabling operation of the UOGM to run the received order quantity when the actual user ID code matches the intended user ID code, thereby enabling efficient and economical management of the time of the UOGM, and that of potential users thereof in a group work environment.

While this invention has been described in conjunction with a particular embodiment thereof, it shall be evident that many alternatives, modifications and variations will be apparent to those skilled in the art. Accordingly, the present invention is intended to embrace all such alternatives, modifications and variations as fall within the spirit and broad scope of the appended claims.

What is claimed is:

1. A group machine time slot reservation and management system including:

a. a machine time slot reservation subsystem including storage means for storing time slot reservation information, calendar and time clock information, time slot status information, intended user identification (ID) code information, and machine control information, for a user operated group machine (UOGM);
   b. receiving and analyzing means for receiving and analyzing machine operation information including order quantity information for said UOGM;
   c. means for checking a status of any time slot corresponding with a current clock time;
   d. programmed means for operating said UOGM to run said received order quantity when said current clock time shows no reserved time slots for said UOGM;
   e. user ID verification means for receiving and processing an actual user ID code against said intended user ID code, when said current clock time corresponds to a reserved time slot; and
   f. programmed means for enabling operation of said UOGM to run said received order quantity when said actual user ID code matches said intended user ID code, thereby enabling efficient and economical management of the time of said UOGM, and that of potential users thereof in a group work environment.

2. A group machine Time Slot Reservation (TSR) process comprising:

a. displaying on a user interface connected to a controller, a Time Slot (TS) and Time Slot Status (TSS) information screen for a User Operated Group Machine (UOGM);
   b. reviewing the Time Slot Status (TSS) information;
   c. providing Time Slot Reservation (TSR) information onto the screen for the UOGM when the TSS information shows at least one Open Time Slot (OTS) for the UOGM; and
   d. confirming and saving at least one TS as a reserved time slot responsively to the provided TSR information, thereby enabling subsequent efficient and economical management of the time of the UOGM, and the time of potential users thereof in a group work environment;
   wherein said displaying step includes displaying selectable date and time calendar information on the screen; and,
   wherein said step of displaying selectable date and time calendar information comprises displaying only current and future date and time selectable calendar information.

3. A group machine TSR process comprising:

a. displaying on a user interface connected to a controller, a Time Slot (TS) and Time Slot Status (TSS) information screen for a User Operated Group Machine (UOGM);
   b. reviewing the Time Slot Status (TSS) information;
   c. providing Time Slot Reservation (TSR) information onto the screen for the UOGM when the TSS information shows at least one Open Time Slot (OTS) for the UOGM; and
   d. confirming and saving at least one TS as a reserved time slot responsively to the provided TSR information, thereby enabling subsequent efficient and economical management of the time of the UOGM, and the time of potential users thereof in a group work environment;
   wherein said displaying step includes displaying time slot symbols and time divisions for designated Time Slots for a particular UOGM during a work group's work day shift;

wherein said step of displaying time slot symbols and time divisions includes displaying interactive selectable time slot symbols; and, wherein said step of displaying interactive selectable time slot symbols includes displaying time slot symbols that open for receiving TSR information only when a time slot corresponding to a time division for such symbol is an open time slot.

4. A group machine TSR process comprising:
a. displaying on a user interface connected to a controller, a Time Slot (TS) and Time Slot Status (TSS) information screen for a User Operated Group Machine (UOGM);
b. reviewing the Time Slot Status (TSS) information;
c. providing Time Slot Reservation (TSR) information onto the screen for the UOGM when the TSS information shows at least one Open Time Slot (OTS) for the UOGM; and
d. confirming and saving at least one TS as a reserved time slot responsively to the provided TSR information, thereby enabling subsequent efficient and economical management of the time of the UOGM, and the time of potential users thereof in a group work environment;
wherein said displaying step includes highlighting already reserved time slots for each calendar month, date and time of day for each UOGM; and,
wherein said displaying step includes displaying and retaining a record of past, present and future time slot reservations for each UOGM.

5. A group machine Reservable Time Slot Management (RTSM) process comprising:
a. receiving and analyzing order information, including an order quantity, for operating a User Operated Group Machine (UOGM);
b. checking a status of any designated Time Slots for the particular UOGM corresponding with a current clock time;
c. requesting an actual User identification (ID) code from the operator actually attempting to use the UOGM when the current clock time corresponds to at least a Reserved Time Slot;
d. comparing the Actual User ID code with a stored Intended User ID code; and
e. operating the UOGM for the received order quantity when the Actual User ID code matches the stored Intended User ID code, thereby enabling efficient and economical management of the time of the UQOM, and that of potential users thereof in a group work environment.

6. The group machine RTSM process of claim 5, including comparing the received order quantity information with a stored control quantity.

7. The group machine RTSM process of claim 5, including operating the machine for the received order quantity when the current clock time shows no reserved Time Slots for the particular UOGM.

8. The group machine RTSM process of claim 5, including operating the UOGM for only a stored control quantity when the received order quantity is greater than the stored control quantity and the Actual User ID code does not match the Intended User ID Code.

9. The group machine RTSM process of claim 5, including a step of alerting the intended user, prior to the receiving and analyzing step, responsively to stored Time Slot Reservation information.

10. A group machine TSR system comprising,
a. a controller assembly including means for processing and storing information, and at least one user interface having display means for displaying stored Time Slot (TS) and Time Slot status information for a User Operated Group Machine (UOGM);
b. input means for providing Time Slot Reservation (TSR) information to said controller assembly for said UOGM when said TSS information includes at least one Open Time Slot for said UOGM; and
c. confirming and saving means for confirming and saving at least one TS as a Reserved Time Slot (RTS), for said UOGM, responsively to said TSR information, thereby enabling efficient and economical management of the time of the UOGM, and that of potential users thereof in a group work environment;
also including alerting means communicating with said controller assembly for alerting an intended user of a Reserved Time Slot (RTS);
wherein said alerting means comprises a light tower including a pole and a light source having an ON state and an OFF state.

11. The group machine TSR system of claim 10, wherein said light source is visible remotely from various workstations within the group work environment.

12. The group machine TSR system of claim 10, wherein said light source is set to be in said ON state said UOGM is running, and in said OFF state when said UOGM is not running.

13. The group machine TSR system of claim 10, wherein said light source includes a flashing ON and OFF state.

14. The group machine TSR system of claim 13, wherein said light source is set to flash ON and OFF when a job being run is interrupted.

* * * * *